No. 757,745. PATENTED APR. 19, 1904.
J. A. HOUSE.
SAWING MACHINE.
APPLICATION FILED MAY 8, 1903.
NO MODEL.
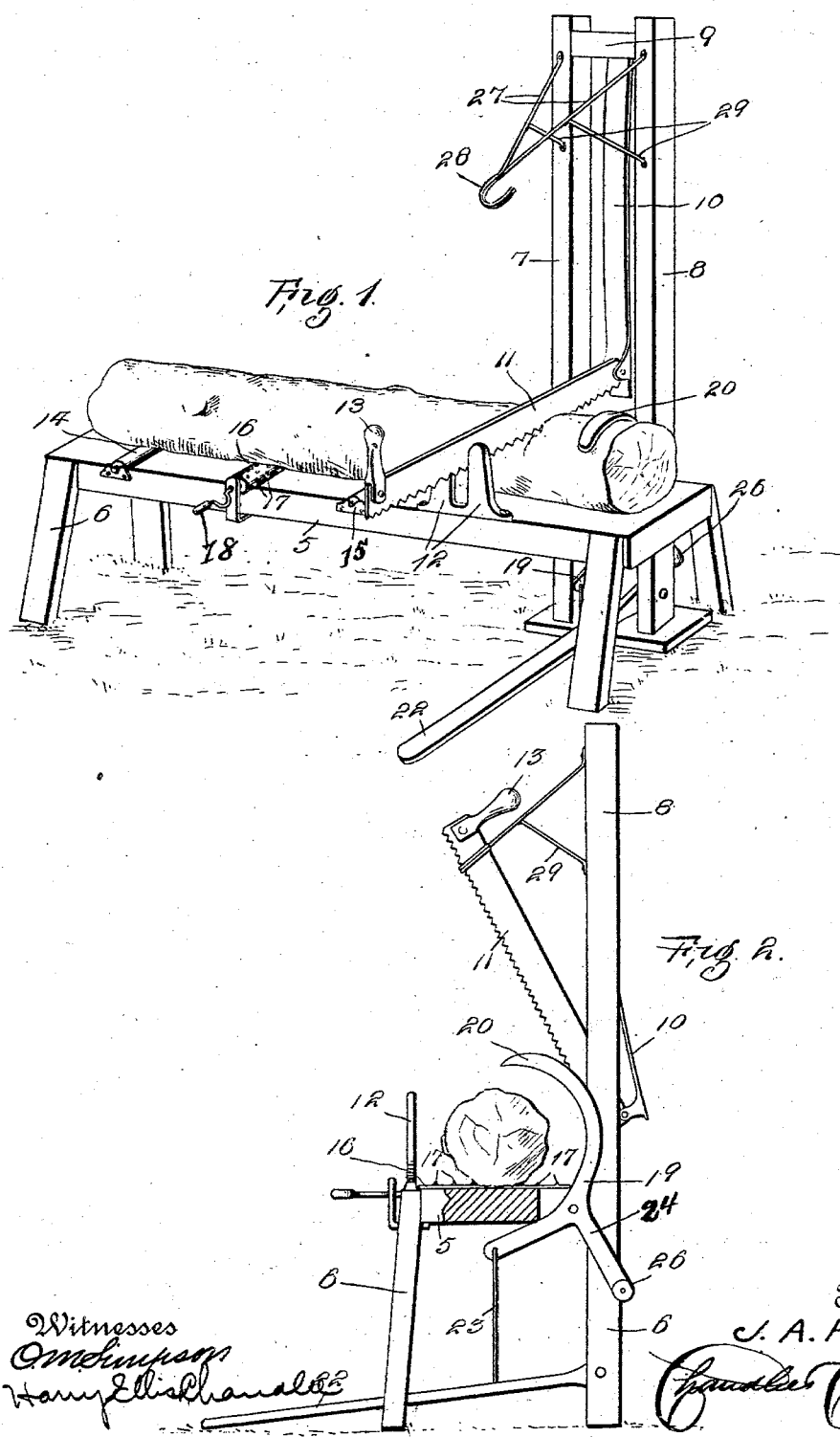

No. 757,745. Patented April 19, 1904.

UNITED STATES PATENT OFFICE.

JOSEPH A. HOUSE, OF NEAR THURSTON, MARYLAND.

SAWING-MACHINE.

SPECIFICATION forming part of Letters Patent No. 757,745, dated April 19, 1904.

Application filed May 8, 1903. Serial No. 156,253. (No model.)

*To all whom it may concern:*

Be it known that I, JOSEPH A. HOUSE, a citizen of the United States, residing near Thurston, in the county of Frederick, State of Maryland, have invented certain new and useful Improvements in Sawing-Machines; and I do hereby declare the following to be a full, clear, and exact description of the invention, such as will enable others skilled in the art to which it appertains to make and use the same.

This invention relates to sawing-machines such as are employed for sawing cord-wood; and it has for its object to provide a machine upon which the logs to be sawed may be placed and which may be operated to feed the log after each cut is made, so that the log will be sawed to the desired lengths without directly handling it.

A further object of the invention is to provide an arrangement of the saw which will permit it to be easily and quickly swung into sawing position and operated when in such position with speed and efficiency and in which the saw when not in use will be held out of the way to permit of shifting of the log.

In the drawings forming a portion of this specification, and in which like numerals of reference indicate similar parts in the several views, Figure 1 is a perspective view showing a machine embodying the present invention with a log in position to be sawed. Fig. 2 is an end elevation of the sawing-machine with the saw raised to inoperative position.

Referring now to the drawings, there is shown a sawing-machine comprising a table 5, supported upon legs 6, and at one side of which table and adjacent to one end thereof are the spaced uprights 7 and 8, which are connected at their upper ends by the cross piece or brace 9.

Bolted to the cross-piece 9 at the opposite side thereof from the table 4 is a spring-plate 10, which forms a hanger for a crosscut-saw 11, which is pivoted to the lower end of the spring-plate and, extending between the uprights 7 and 8, projects above and transversely of the table 5. The saw when in its lowered position, as shown in Fig. 1, lies in the guides 12, which are secured in opposite sides of the table. At the end of the saw 11, opposite to the spring-hanger 10, is a handle 13, which may be grasped to swing the saw transversely of the table.

On the table are the two rollers 14 and 15, one of which is just in the rear of the saw, while the other is at the end of the table at the same side of the saw, the rollers being journaled transversely of the upper face of the table, so that they may receive and support a log in its passage longitudinally of the table to the saw. Mounted also transversely of the table, between the rollers 14 and 15, is a third roller 16, provided with radiating spikes 17 and with a crank 18, by means of which it may be rotated. The spikes 17 project slightly above the rollers 14 and 15, so that they may engage in a log that may rest on the rollers 14 and 15, and when the roller 16 is rotated the log will be fed longitudinally in a corresponding direction.

To hold a log securely upon the table, a log-clamp is provided, and it consists of an angular lever 19, which is pivoted at its angle to the table and has a hook 20 at its upper end disposed to engage over a log on the table when the angular lever is swung upon its pivot in one direction. To thus swing the angular lever, a treadle 22 is provided and is pivoted at one end to the uprights at the rear of the table. A pitman 23 connects the free end of the angular lever with the treadle, so that when the treadle is depressed the clamping-jaw will be engaged over the log, as will be understood. To move the clamping-jaw from the log when the treadle is released and hold it normally in such position, an arm 24 extends from the outer side of the angular lever, at the pivot thereof, and has a terminal counterbalancing-weight 26, which in its downward movement serves to retract the clamping-jaw and raise the treadle.

In order that the saw may be held in raised position while the log is being fed, a bracket is fastened to the uprights 7 and 8 and consists of the downwardly-convergent arms 27, which are attached to the uprights, said arms meeting at their lower ends, where they are bent to form a hook 28. Brace-arms 29 extend upwardly and convergently from the uprights 7 and 8 and are attached to the arms 27 in the rear of the hook. The hook is in such position that the saw may be swung upwardly upon its pivotal connection with the hanger 10 and may be engaged with the hook at a point just below the handle of the saw. After the log has been shifted or a new log put in place and properly clamped the saw may be lowered onto the log and then reciprocated to cut the log.

It will be understood that in practice modifications of the specific construction shown may be made and that any suitable materials and proportions may be used for the various parts without departing from the spirit of the invention.

What is claimed is—

A sawing-machine comprising a table, uprights at one side of the table, a cross-beam connecting the upper ends of the uprights, a spring-plate secured against the cross-beam and depending therefrom, and having forwardly-directed ears at either side thereof at its lower end, a saw pivoted at one end and lying between the uprights and transversely of the table, a bracket attached to the uprights and extending outwardly and downwardly therefrom and having a hook thereon for the engagement of the free end of the saw when the latter is raised, a bifurcated plate secured to the table and extending upwardly therefrom and adapted to receive the saw within its bifurcation, a clamp comprising an arc-shaped member having diverging arms at one of its ends, one of said arms being pivoted to the table said arc-shaped plate being adapted for coöperation with the table to clamp a log thereagainst and a treadle connected with the remaining arm of the clamp to operate the latter.

In testimony whereof I affix my signature in presence of two witnesses.

JOSEPH A. HOUSE.

Witnesses:
  FRANK D. BLACKISTONE,
  HARRY ELLIS CHANDLER.